Aug. 21, 1945.   R. G. LE TOURNEAU   2,383,266
FEED CARRIAGE ASSEMBLY FOR LATHES
Filed Nov. 24, 1941   3 Sheets-Sheet 1
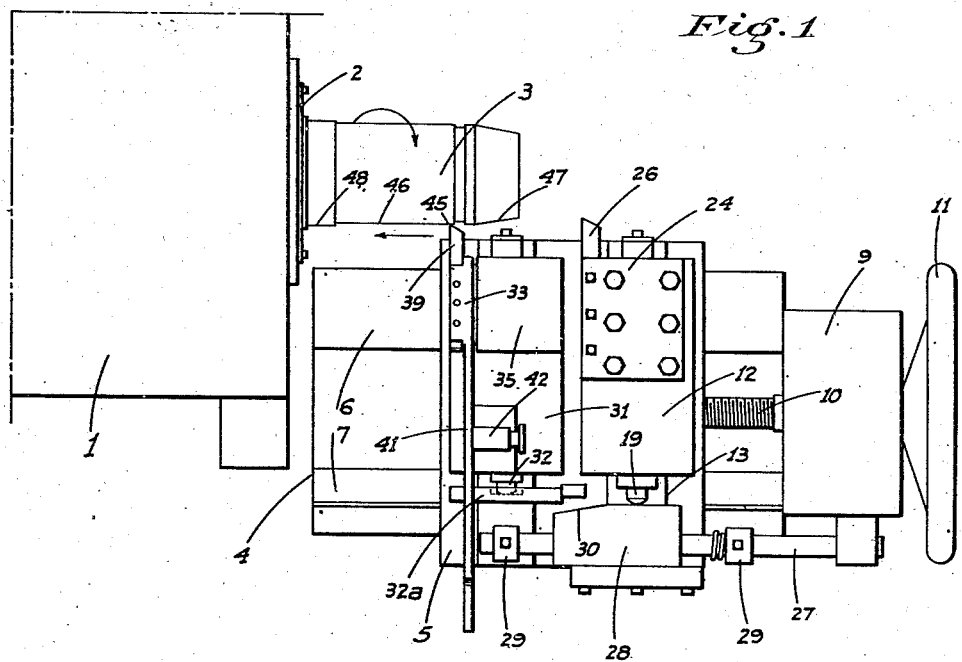
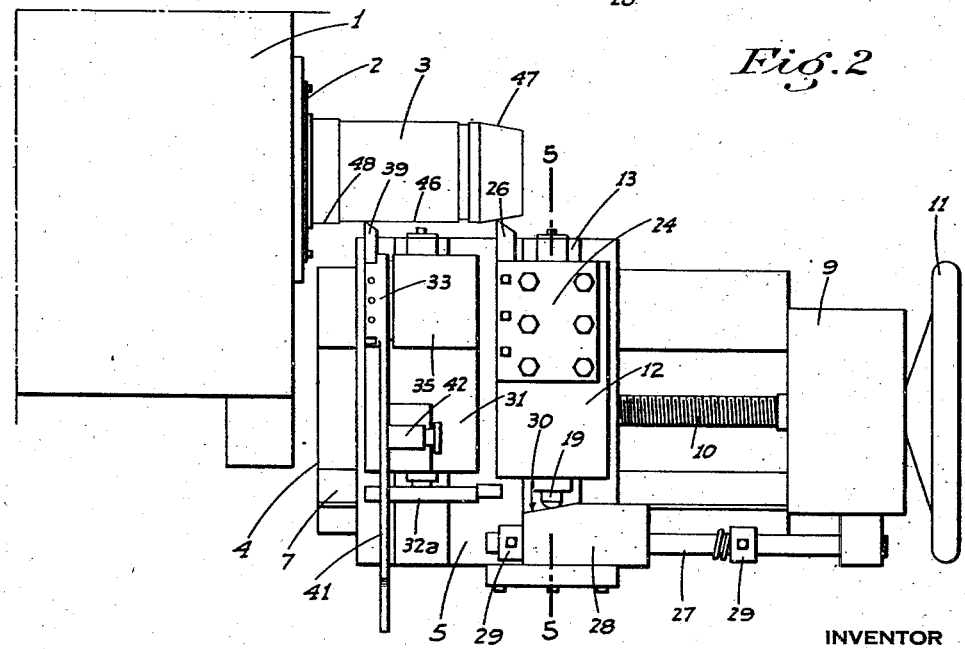
INVENTOR
R. G. LeTourneau
BY
ATTYS Aug. 21, 1945.  R. G. LE TOURNEAU  2,383,266
FEED CARRIAGE ASSEMBLY FOR LATHES
Filed Nov. 24, 1941   3 Sheets-Sheet 2

INVENTOR
R. G. Le Tourneau
BY
ATTYS

Aug. 21, 1945.   R. G. LE TOURNEAU   2,383,266
FEED CARRIAGE ASSEMBLY FOR LATHES
Filed Nov. 24, 1941   3 Sheets-Sheet 3

INVENTOR
R. G. LeTourneau
BY
ATTYS

Patented Aug. 21, 1945

2,383,266

UNITED STATES PATENT OFFICE 2,383,266

FEED CARRIAGE ASSEMBLY FOR LATHES

Robert Gilmore Le Tourneau, Peoria, Ill., assignor to R. G. Le Tourneau, Inc., a corporation of California Application November 24, 1941, Serial No. 420,244

6 Claims. (Cl. 82—14)

This invention relates generally to improvements in engine lathes, and in particular is directed to a unique feed carriage assembly.

The principal object of the invention is to provide a feed carriage assembly which includes dual cross slides arranged for simultaneous operation whereby separate and different cuts may be taken on the work at the same time, thus simplifying the machining of work requiring multiple cuts and reducing the time of such operations.

Another object of the invention is to provide, in an engine lathe, a longitudinally fed carriage assembly including a tool supporting cross slide which is automatically fed relative to the work for angle cuts or the like; this automatic feeding being accomplished through means including a novel cam mechanism.

A further object of the invention is to provide a longitudinally fed carriage assembly which supports multiple tools and is especially designed for use to effect different and multiple cuts in the machining of projectile cases without removing the latter from the lathe chuck, two of such cuts being accomplished simultaneously, while a third cut is taken subsequently and after automatic cessation of one of the other cuts.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a plan view of the lathe showing the carriage in starting position.

Figure 2 is a plan view of the lathe showing the position of the carriage after partial completion of two of the cuts; one of said cuts being an angle cut for which the corresponding tool is automatically regulated, as will hereinafter appear.

Figure 3:
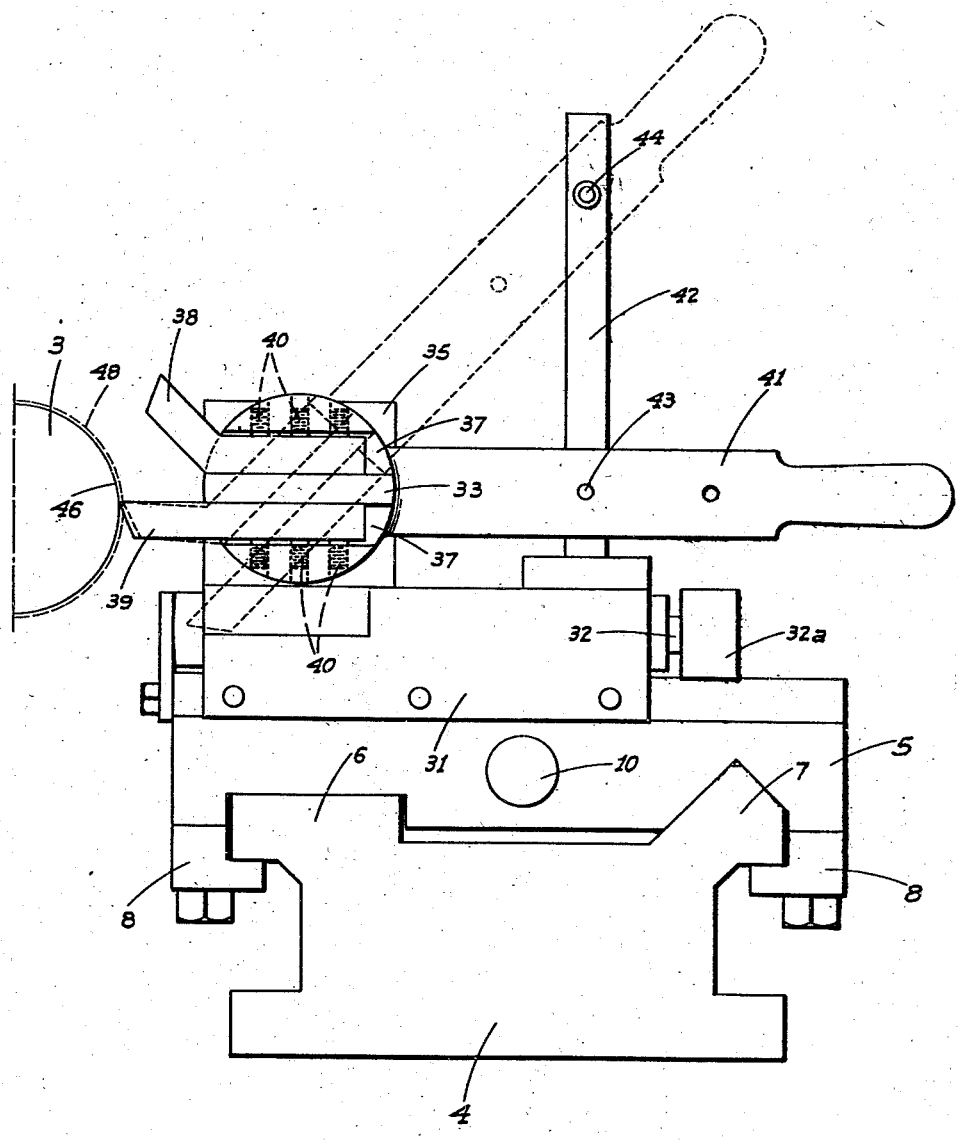
Figure 3 is an enlarged end view of the carriage assembly showing the vertical turret as mounted on one of the cross slides.
Figure 4:
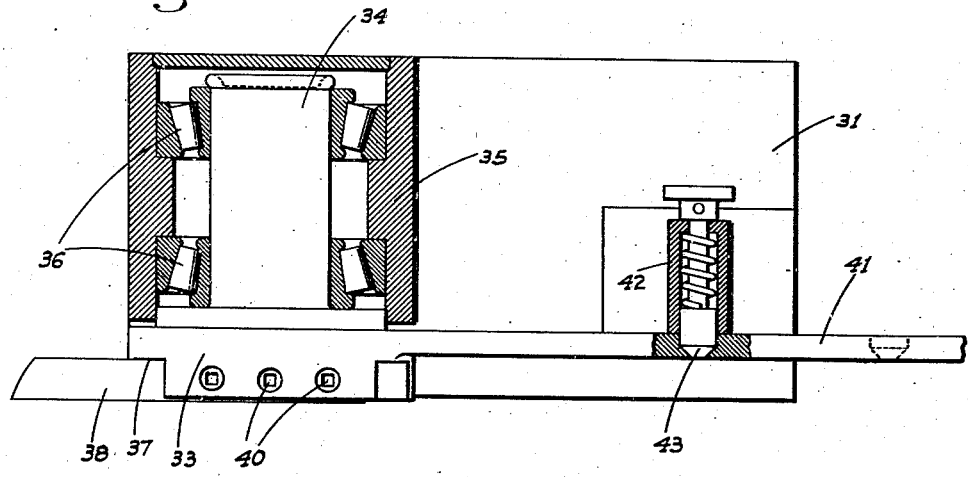
Figure 4 is an enlarged fragmentary top plan partially in section of the vertical turret.
Figure 5:
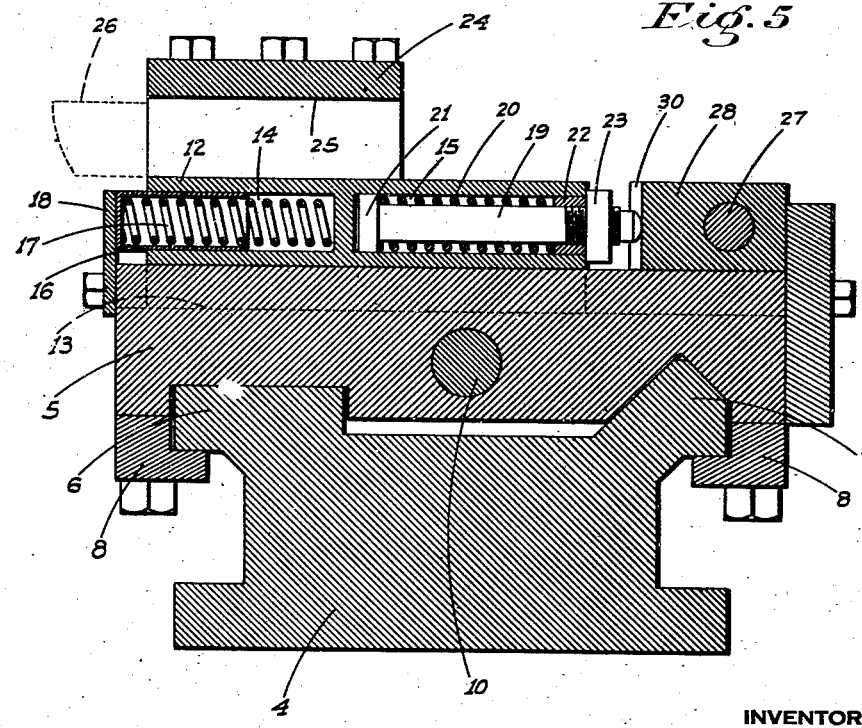
Figure 5 is an enlarged cross section of the carriage assembly taken on line 5—5 of Fig. 2.

Referring now more particularly to the characters of reference on the drawings, the numeral 1 indicates the headstock of the lathe fitted with a driven chuck 2 which may either be of conventional construction or a special adaptation, as may be necessary for specialized work. In the present instance the chuck is designed to grip one end of a projectile case 3 which is unsupported at the other end and a substantial portion of which is exposed for machining.

A lathe bed 4 is offset laterally relative to the chuck and extends longitudinally of the machine, such bed being of heavy-duty construction and suitably mounted and supported.

A substantially rectangular carriage 5 is mounted on the bed 4 for movement lengthwise of the latter; the bed including longitudinal tongues 6 and 7 which ride in corresponding grooves at the bottom of the carriage, and there being longitudinal flange members 8 which engage beneath said tongues, preventing relative separating movement of the carriage 5 from the bed 4.

At the end opposite headstock 1 the lathe includes a lead screw gear box 9, which drives a lead screw 10 which extends from said gear box through the carriage 5 in threaded and operative relation to the same. The gear box 9 is powered in any suitable manner and a hand wheel 11 associated with the gear box 9 permits of manual rotation of the lead screw 10 when necessary.

The carriage 5 is fitted with and supports a cross slide 12 which is disposed on the end portion of said carriage adjacent gear box 9. The cross slide 12 is connected with the carriage 5 by means of dovetail ways 13. Opposed sockets 14 and 15 of substantial depth are formed in and are open to opposite ends of the cross slide 12, such sockets being disposed in end to end alinement. The socket 14, which is the innermost one, i. e., adjacent the work, is fitted with a relatively slidable fixed sleeve 16 which is closed at its outer end, there being a compression spring 17 seated in said socket and extending from the bottom of the latter to the closed end of the sleeve; the adjacent outer end portion of said sleeve projecting some distance beyond the corresponding end of cross slide 12. This sleeve abuts a stop plate 18 secured on and upstanding from the inner side of carriage 5. The compression spring 17 is always under compression, thus urging the cross slide 12 in a direction away from the work.

A pin 19 is disposed axially in socket 15 and projects to a termination some distance beyond the initially open end of said socket. A compression spring 20 surrounds such pin within socket 15 between a head 21 on the inner end of the pin and a bushing 22 in the socket at said open end. An adjustment collar 23 is threaded on the projecting portion of pin 19 and seats against the adjacent end of the cross slide.

A tool holding head 24 is mounted atop the cross slide 12 at the end adjacent the work and this head includes a socket 25 adapted for the adjustable reception of the tool 26.

A shaft 27 fixed on the bed 4 projects longitudinally above carriage 5 outwardly of the cross slide 12 and parallel to the lead screw 10, there being a sliding cam block 28 on said shaft; said cam block at the bottom being in face to face engagement with the upper surface of carriage 5, whereby to prevent rotation of said block relative to shaft 27. Sliding movement of cam block 28 along shaft 27 is limited by means of adjustable stop collars 29; such stop collars being adjusted so as to permit of predetermined travel of the cam block and to assure that said cam block does not escape the carriage 5.

The inner edge of cam block 28 is formed with a cam surface 30, the configuration of which corresponds to the cut desired to be made by tool 26 on the work and which cut—in the present instance—is a taper cut on the outer or exposed end portion of the chuck supported projectile case 3. The outer end of pin 19 is rounded and normally engages the inner edge of cam block 28 which includes the cam surface 30.

Another cross slide 31 is mounted on the carriage 5 in the same manner as cross slide 12. However, cross slide 31 does not have an automatic or cam feed and its adjustment to and from the work is accomplished by manually operated means which includes an adjustable stop 32 between the outer end of said slide and a cross bar 32a fixed on the adjacent portion of carriage 5. The bar 32a also extends across the path of movement of slide 12 toward the cam, to limit the movement of the same when the member 19 leaves the forward end of the cam.

The cross slide 31 carries what may be termed a vertical turret, which comprises the following parts: A cylindrical head or tool holder 33 is disposed above the cross slide 31 adjacent its inner end and one side thereof, said tool holder being disposed with its axis horizontal and parallel to the axis of the headstock. A rigid spindle 34 projects from one face of the tool holder into an upstanding housing 35 on cross slide 31, this spindle being secured in the housing by antifriction bearings 36. Parallel tool-receiving slots 37 are cut into the tool holder from the periphery thereof and on opposite sides of its axis. Separate tools, indicated generally at 38 and 39, have their shanks seated in slots 37 and are maintained against escape therefrom by a plurality of Allen bolts 40 which engage each shank.

A radial handle 41 projects from the tool holder 33 in a direction away from the work or toward the outer edge of the carriage which the handle overhangs. Adjacent the outer edge of the cross slide 31 there is an upstanding post 42 against which the handle 41 engages. When in horizontal position the handle 41 is releasably locked with the post 42 by a spring-pressed detent indicated generally at 43, which is mounted on said post, and when in elevated position, as shown in dotted lines in Fig. 3, the handle is locked to said post by another spring-pressed detent 44.

Operation

The above-described lathe mechanism functions in the following manner:

At the outset the carriage assembly is in the position shown in Fig. 1; the projectile case to be machined having previously been secured in centered and supported relation in the chuck 2. The gearing in box 9 is then placed in operation, causing the carriage 5 to slowly advance toward the work. The handle 41 is normally in lowered or horizontal position and the tool 39 first engages the work at a point 45, and, with continued advance of the carriage, machines the central and constant-diameter portion 46 of the body of the shell casing 3. As the carriage so advances the tool 26 comes into engagement with the projectile case 3 at its outer end. The cam block 28, which is carried forward on shaft 27 by frictional engagement, reaches the limit of its travel just ahead of the time that tool 26 first engages the work. Thereupon, with continued movement of the carriage in the direction of the headstock the rounded end of the pin 19 rides along the cam surface 30, which in the present instance is a straight taper, resulting in the slide 12 backing away from the work by the action of spring 17, and the tool 26 machining the corresponding straight taper 47 on the outer end portion of the projectile case 3, as is clearly shown in Fig. 2.

When the tool 26 reaches an advanced point, which is the end of the taper, the pin 19 escapes cam surface 30 and the action of compression spring 17 withdraws the tool 26 from the work. At substantially the same time the tool 39 has completed the constant diameter cut on the central portion of the case 3, whereupon the operator releases handle 41 and swings it upward to the position shown in dotted lines in Fig. 3. This withdraws tool 39 from the work and brings tool 38 into engagement with the work, this latter tool being set to cut to a larger diameter; the tool 38—as the carriage continues to advance—turning the bourrelet 48 on the case 3 and adjacent chuck 2.

With this cycle of operations complete the lead screw 10 is reversed and the carriage backs up to starting position. As the carriage backs up the pin 19 reengages cam block 28 and rides up cam surface 30 onto the straight portion of said block, frictionally carrying the latter back to starting position adjacent the stop collar 29 disposed nearest the gear box 9. Thereafter the cycle of operations is repeated on the next projectile case.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a lathe which includes a bed and a power fed longitudinally movable carriage mounted thereon; a cross slide mounted on the carriage, a tool carried by the cross slide, a horizontal shaft mounted in fixed connection with the bed and disposed adjacent but outwardly of the cross slide parallel to the direction of movement of the carriage, a cam member slidably mounted on said shaft, means on the shaft to limit movement of said cam member through a predetermined path, said member having a cam face of predetermined pattern facing the cross slide, and an element mounted on said cross slide and normally engaging said cam face in frictional but sliding relation.

2. A device as in claim 1 in which the shaft intermediate its ends overhangs the carriage; the cam member being a block having a bottom surface frictionally engaging the upper surface of the carriage in relatively slidable relation whereby to prevent rotation of said member about the shaft.

3. A device as in claim 1 in which said limiting means comprises stop collars mounted on the shaft at spaced points and between which the cam member is adapted to move; the cam member alternately abutting said stop collars with to and fro movement of the carriage, said element on the cross slide sliding along the cam face in one direction when the cam member abuts one collar and sliding along the cam face in the other direction when the cam member abuts the other collar.

4. In a lathe which includes a bed and a power fed longitudinally movable carriage; a pair of cross slides mounted on said carriage in side by side relation, a tool mounted on one cross slide, a vertical turret mounted on the other cross slide, a pair of tools mounted on said turret for alternate movement to work engaging position, and means connected between the bed and said one cross slide to automatically feed the latter so that its tool defines a predetermined pattern with advancing movement of the carriage through a certain path, one of the tools of said pair being adapted to be in work engaging position throughout said path of movement of the carriage, and the other tool of said pair being adapted to be moved into work engaging position as the tool of said one cross slide reaches the end of said pattern and upon continued advance of the carriage beyond said predetermined path.

5. A device as in claim 4 in which said one cross slide is automatically retracted so as to withdraw its tool from the work as said tool reaches the end of said pattern.

6. In a lathe which includes a bed and a power fed longitudinally movable carriage mounted thereon; a cross slide mounted on the carriage, and a vertical turret mounted on the cross slide; said turret comprising a head mounted for rotation about a horizontal axis parallel to the direction of movement of the carriage, multiple tools mounted on said head and projecting therefrom for selective disposition in work engaging position, means to effect rotation of said head, and means to lock the head against rotation when any one of the tools is in working position; said first named means cmprising a substantially radial handle lever projecting from the head, an upstanding post on the cross slide and against which post said handle abuts, and spring-pressed detents arranged to lock the handle to the post in different positions with different tools in work engaging position.

ROBERT G. LE TOURNEAU.